United States Patent
Greifeneder

(10) Patent No.: US 9,342,219 B2
(45) Date of Patent: May 17, 2016

(54) METHOD FOR ADAPTING THE GRAPHIC REPRESENTATION ON THE USER INTERFACE OF A COMPUTER USER STATION

(71) Applicant: ABB Technology AG, Zurich (CH)

(72) Inventor: Jürgen Greifeneder, Mannheim (DE)

(73) Assignee: ABB TECHNOLOGY AG, ZURICH (CH)

( * ) Notice: Subject to any disclaimer, the term of this patent is extended or adjusted under 35 U.S.C. 154(b) by 516 days.

(21) Appl. No.: 13/767,453

(22) Filed: Feb. 14, 2013

(65) Prior Publication Data

US 2013/0219314 A1    Aug. 22, 2013

(30) Foreign Application Priority Data

Feb. 18, 2012   (DE) .......................... 10 2012 003 297

(51) Int. Cl.
*G06F 3/0484* (2013.01)
*G05B 19/418* (2006.01)

(52) U.S. Cl.
CPC .......... *G06F 3/0484* (2013.01); *G06F 3/04842* (2013.01); *G05B 19/418* (2013.01); *G06F 2203/04806* (2013.01); *G09G 2340/045* (2013.01); *G09G 2354/00* (2013.01)

(58) Field of Classification Search
CPC ............... G05B 19/41885; G05B 2219/23258; G05B 2219/32128; G05B 19/41865; G05B 2219/25067; G05B 2219/31474; G05B 2219/36172; G05B 2219/37208; G05B 2219/23163; G05B 2219/23178; G05B 2219/31479; G05B 19/418; G06F 2203/04806; G06F 3/0484; G06F 3/04842; G09G 2340/045
See application file for complete search history.

(56) References Cited

U.S. PATENT DOCUMENTS

| | | | | |
|---|---|---|---|---|
| 5,933,142 A | * | 8/1999 | LaStrange et al. | 715/788 |
| 7,249,327 B2 | * | 7/2007 | Nelson et al. | 715/782 |
| 8,319,800 B2 | * | 11/2012 | Pan et al. | 345/660 |
| 8,698,846 B2 | * | 4/2014 | Suzuki et al. | 345/660 |

(Continued)

FOREIGN PATENT DOCUMENTS

| | | |
|---|---|---|
| DE | 10 2010 036 757 A1 | 5/2011 |
| WO | 2011/072731 A1 | 6/2011 |
| WO | 2011/129981 A3 | 10/2011 |

OTHER PUBLICATIONS

European Search Report issued in corresponding European patent application no. 13000353.6 dated Jan. 8, 2016.

*Primary Examiner* — Nicholas Ulrich
(74) *Attorney, Agent, or Firm* — Buchanan Ingersoll & Rooney PC

(57) ABSTRACT

Exemplary embodiments relate to a method for adapting graphic representation on a user interface of a computer user station for the graphic representation of data of an industrial processing plant. Input signals received on or at the computer user station result in a size change of the graphic representation by zooming of the predefinable display region on the user interface or the selection of an object field of the graphic representation. The object field being located in the graphic representation at an associated object field position, for display or user interaction. With the selection of an object field for display or user interaction, the size of the object field on the user interface is fixed for display or user interaction, even if zooming of the graphic representation results in other data of the graphic representation not being readable or activatable by a user.

21 Claims, 3 Drawing Sheets

(56) References Cited

U.S. PATENT DOCUMENTS

| | | | |
|---|---|---|---|
| 2009/0055741 A1* | 2/2009 | Maeda et al. | 715/709 |
| 2009/0100365 A1* | 4/2009 | Sjolin | 715/765 |
| 2010/0053221 A1* | 3/2010 | Kaneko et al. | 345/684 |
| 2010/0175029 A1* | 7/2010 | Williams | 715/835 |
| 2010/0188410 A1* | 7/2010 | Gilbert et al. | 345/473 |
| 2010/0299629 A1* | 11/2010 | Faist et al. | 715/801 |
| 2011/0035702 A1* | 2/2011 | Williams et al. | 715/800 |
| 2012/0041570 A1* | 2/2012 | Jones et al. | 700/17 |
| 2012/0066622 A1* | 3/2012 | Park et al. | 715/764 |
| 2013/0031501 A1* | 1/2013 | Kodosky et al. | 715/771 |

* cited by examiner

METHOD FOR ADAPTING THE GRAPHIC REPRESENTATION ON THE USER INTERFACE OF A COMPUTER USER STATION

RELATED APPLICATION

This application claims priority under 35 U.S.C. §119 to German Application 10 2012 003297.8 filed in Germany on Feb. 18, 2012, the content of which is hereby incorporated by reference in its entirety.

FIELD

The disclosure relates to a method for adapting a graphic representation on a user interface of a computer user station for the graphic representation of data associated with an industrial processing plant.

BACKGROUND INFORMATION

Representing data, e.g., process, status, control and/or regulating data, of an industrial processing plant, such as a paper machine, a refinery, a chemical production plant, a food production plant, or the like, on a user interface of a computer user station in a graphic representation is known. Individual selected data of the respective industrial processing plant are graphically represented on the user interface in a dialogue field, also called an object field, which is applied for the respective processing data.

While known processing user interfaces, e.g., "process faceplates", contain dynamic display contents, such as, measured values or alarms, they are static in regard to their overall appearance, as an independent image can be prepared for each plant part or each desired view. A change between views or plant parts is performed by switching over between various process faceplates.

Other known user interfaces offer the possibility of zooming into or out of a process graphic. This principle allows an overview of the plant, and also parts of the plant, including the links in-between, to be displayed. In contrast to the variant having static faceplates, only one single large and simultaneously detailed process faceplate should be applied. Because background logic decides which information is displayed from which (e.g., based on an) enlargement factor, also called a zoom factor, it is possible to view arbitrary subregion details in nearly arbitrary enlargement.

One problem is in the logic relating to the display decision, e.g., which object fields are to be displayed with which information content at or from, respectively, which enlargement factor. In known systems, this action can be performed via size profiles, in which various display and representation modalities are stored, e.g., the minimum size of a displayed item of information, the space availability, or parameters which are actively set for specific object fields.

However, in some situations it can be desired to have certain information available in all views. This could be, for example, a specific critical measured value to be monitored in all views for reasons of processing safety. Another example is the operation of a specific safety-relevant fitting, for example, a valve. A user interaction via the user interface is also to be possible here in all views.

SUMMARY

An exemplary method for adapting a graphic representation on a user interface of a computer user station for the graphic representation of data of an industrial processing plant is disclosed, comprising: receiving, for display, input signals on or at the computer user station to change a size of the graphic representation by zooming a predefinable display region on the user interface and selecting an object field of the graphic representation, the object field being located in the graphic representation at an associated object field position; and with the selection of an object field for display or user interaction, fixing the object field on the user interface in a size sufficient for display or user interaction, even if a size change of the graphic representation into a range unsuitable for the display or for the user interaction occurs due to zooming.

An exemplary non-transitory computer-readable storage medium on which a program is stored, the program when loaded into a storage means of the computer user station, allows the computer user station to execute a method for the graphic representation of data of an industrial processing plant on a user interface is disclosed, comprising: receiving input signals on or at the computer user station to change a size of the graphic representation by zooming a predefinable display region on the user interface or selecting an object field of the graphic representation, which is located in the graphic representation at an associated object field position, for display; and with the selection of an object field for display or user interaction, fixing the object field on the user interface in a size sufficient for display or user interaction, even if a size change of the graphic representation into a range unsuitable for the display or for the user interaction occurs due to zooming.

An exemplary method for adapting a graphic representation of an industrial processing plant on a user interface of a computer user station, the computer user station having at least one input device is disclosed, the method comprising: selecting, through the at least one input device, an object field of the graphic representation on the user interface; adjusting, through the at least one input device, a size of the graphic representation by a specified factor; and fixing the object field on the user interface in a size sufficient for display when the specified factor of the size adjustment of the graphic representation is outside of a threshold.

BRIEF DESCRIPTION OF THE DRAWINGS

The disclosure and further exemplary embodiments and improvements as well as further advantages are to be explained and described in greater detail on the basis of the drawing, in which an exemplary embodiment of the disclosure is shown.

In the figures

DETAILED DESCRIPTION

Figure 1:
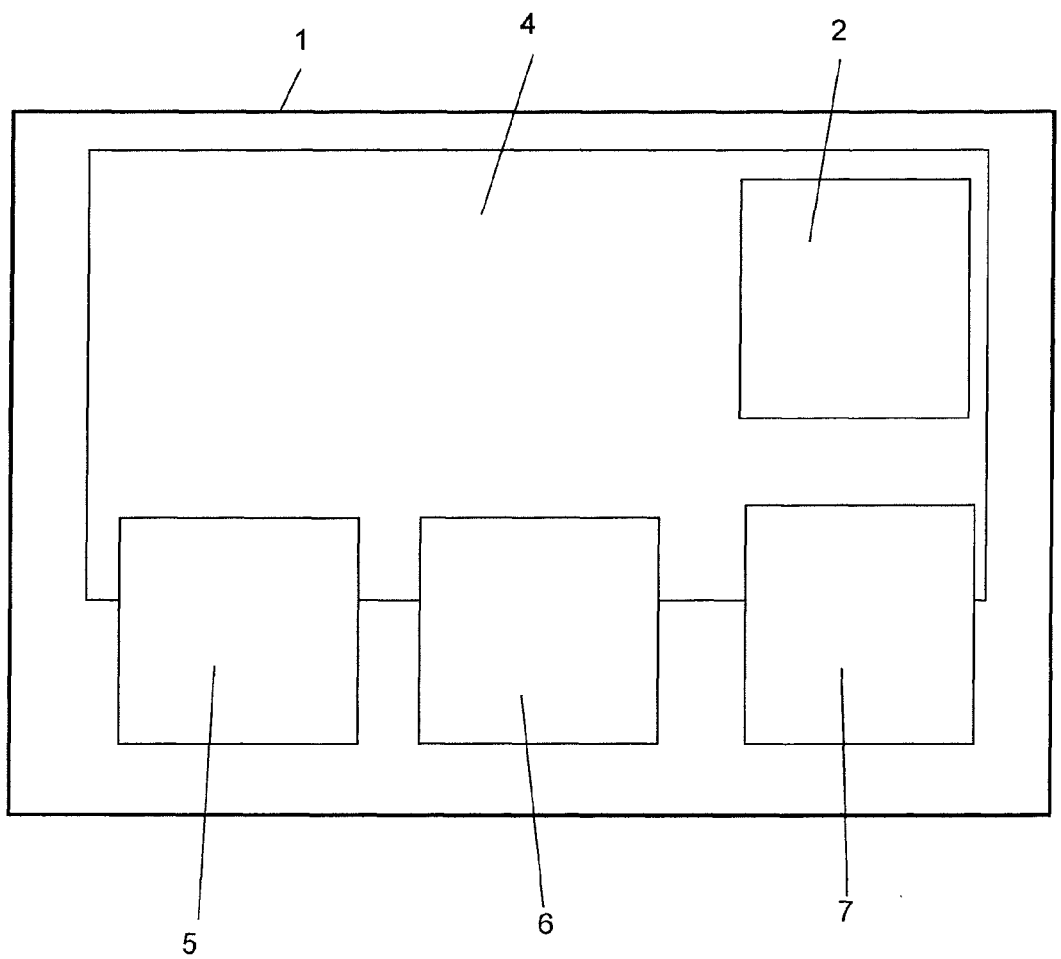
FIG. 1 schematically shows an overview of the user display screen of a computer user station having a user interface according to an exemplary embodiment of the disclosure, FIG. 2 schematically shows an overview of the user display screen of FIG. 1, wherein the size of the graphic representation was decreased by zooming, and FIG. 3 schematically shows an overview of the user display screen of FIG. 1, wherein the size of the graphic representation was enlarged by zooming according to an exemplary embodiment of the disclosure.

Exemplary embodiments of the present disclosure provide a simple method for zooming into or out of a processing graphic, which allows specific items of information to still be available in sufficient size and specific user interactions to still be possible even if the enlargement factor has become unsuitable during the zooming for observation or for operation.

Exemplary embodiments of the disclosure relates to an arrangement, comprising at least one computer user station for the graphic representation of data of an industrial processing plant.

Exemplary embodiments of disclosure additionally relate to a computer program, which allows a computer user station (e.g., a processor) for the graphic representation of data of an industrial processing plant having a user interface, after the computer program has been loaded into storage means of the computer user station, to carry out a method for adapting the graphic representation on the user interface, as well as a non-transitory computer-readable storage medium (e.g., hard disk drive, flash memory, optical memory, or any other type of non-volatile storage device as desired), on which a program is stored, which allows a computer user station for the graphic representation of data of an industrial processing plant having a user interface, after the computer program has been loaded into storage means (e.g. memory) of the computer user station, to carry out a method for adapting the graphic representation on the user interface.

Thus, according to exemplary embodiments disclosed herein, with the selection of an object field for the purpose of display or user interaction, the object field is fixed on the user interface in a size sufficient for the display or the user interaction, even if a size change of the graphic representation into a range which is unsuitable for the display or for the user interaction occurs by zooming.

The fixing of an object field is also designated as pinning, a fixed object is then also designated as a pin, and the position of the fixed object can also be designated as the pin position.

An exemplary method according to the present disclosure allows the user to fix individual object fields or information easily on a zoomable user interface, to "pin it down" in a way, and in this way ensure that this object field or an important item of information is still displayed in a sufficient size and in an assignable manner, e.g., at the associated graphic position or in direct proximity thereto, even if the enlargement factor during the zooming is actually selected as excessively small for this object.

The user now has the capability of deciding, based on the case, to always have individual object fields or items of information displayed and to perform the associated selection of the corresponding object field. This increases the operating comfort, on the one hand, and the safety, on the other hand.

According to an exemplary embodiment of the present disclosure, the fixing of the object field occurs at or close to its object field position. The information contained in this object field is then always still assignable to its original context.

According to another exemplary embodiment of the present disclosure, a displacement of the selected object field into an edge strip on the user interface occurs.

According to yet another exemplary embodiment of the present disclosure, the displacement into the edge strip can occur if a displacement of the object field position into a region outside the user interface occurs due to zooming.

Thus, in the functionality expanded according to an exemplary embodiment, an edge strip is applied, which receives fixed, "pinned down" objects, if the graphic section to which they actually belong is no longer displayed, for example, because another section was selected. As soon as the pin position comes back into the display region, the display object changes from the edge strip back to the associated position.

In another exemplary embodiment, it can be possible to fundamentally display all set pins in an edge strip, wherein these can then still be displayed on the faceplate section during zooming, if the associated pin position is in the display section.

According to yet another exemplary embodiment, the fixing of the object field occurs at a predefinable position, which deviates from the original object field position.

For example, in an exemplary method disclosed herein, the user is given the possibility of anchoring pins at arbitrary positions on the graphic, e.g., instead of displaying them where they actually belong, of selecting another arbitrary position. The functionality of the visibility in all planes is not affected thereby. This can also be linked to the edge strip functionality.

According to an exemplary embodiment of the present disclosure, a predefinable condition can be assigned to the selected object field for its automatic removal from the user interface.

In this embodiment of the exemplary method according to the disclosure, set pins can have conditions for their automatic removal appended. These conditions can be of greatly varying types. The following are mentioned as examples and in a nonrestrictive manner: a) time condition, for example, "maintain this pin for the next five minutes" or b) value-causal, for example, until a specific sensor value leaves a specific range. The selected conditions can be arbitrarily complex and can be combined. Conditions are also possible which refer to other plant parts or are dependent on data or states in other plant parts.

Pins which have not had any condition appended or whose condition has not yet been fulfilled are maintained until they are manually removed, or until the condition is still fulfilled.

According to an advantageous embodiment of the disclosure, an archive function is provided, which detects the selection or the removal of an object field in an archiving manner.

In this embodiment of the method according to the disclosure, an archive functionality can be provided, which is manually or automatically activated and which notes the placement and the removal of pins.

In a further embodiment, this archive functionality can be placed both globally (e.g., for all pins) or for individual pins.

In a further exemplary embodiment, not only the placement and removal of pins, but rather also time curves of the pinned object or the pinned information, respectively, can be archived. In this case, this is also referred to as automatic logging.

Still in another exemplary embodiment, the archive functionality can be triggered by conditions which relate, for example, to the system state or the object type. For example, such a condition could read that pinned feedback signals are always archived.

In a further embodiment, a reason for the removal of the object field can be detected in an archiving manner upon removal of an object field.

Further, exemplary embodiments of the disclosure can be inferred from the subclaims.

FIG. 1 schematically shows an overview of the user display screen of a computer user station having a user interface according to an exemplary embodiment of the disclosure. For example, FIG. 1 schematically shows an overview of the user display screen of a computer user station for the graphic representation of data of an industrial processing plant, having a user interface 1, on which the graphic representation of various object fields 2, 4, 5, 6, 7 occurs.

In modern industrial processing plants, there are numerous processes and subprocesses which should be controlled and monitored by the user via user display screens of the control system. To obtain an overview of the processes, the control systems are designed such that all important components such as motors, valves, pumps, etc. are represented and connected in accordance with the exemplary function via lines, which represent the material flow profile. The current operating states can be individually visualized in the form of numeric values, such as in proximity to the represented components or parts. In an exemplary embodiment, the user interface which is displayed on the user display screen of a control system can be recreated from the engineering drawings of the plant. These include process and instrumentation drawings, pipeline drawings, and sometimes also drawings which reflect the local division of the plant.

A control system for representing and controlling industrial processing plants, for example, plants for paper production, or for the production of a chemical, thus can include at least one user display screen having at least one user interface for representing the process and/or at least one subprocess, and/or for changing processing parameters. The system can also include an operating element for the selection and/or activation and/or change of at least one processing parameter, and it can further include lines for identifying flows, for example, material flows. Processing parameters are, for example, material flows, machine settings, valve settings, speeds, pressures, or the like. Operating elements can be, for example, in the form of cursors, text input fields, displayed elements, which can be changed in size using the mouse, slide controls, or other control elements as desired and, used for input functions in computer programs and/or systems. Possibilities are frequently also found, for example, of simply opening special windows by mouse clicks in a first step, in which special windows further operating actions are then actuated.

In order to obtain a better overview of the process and/or subprocess, and to be able to better judge the procedures playing out as a whole in the process, the subprocess, or the plant, or to better judge the flows, for example, the above-mentioned material flows, from a technological and economic aspect, the process and/or subprocess is represented by means of graphic elements, also called object fields here, on the user interface 1 of the user display screen.

In the exemplary system of FIG. 1, the current graphic representation is selected such that one large object field 4 and four smaller object fields 2, 5, 6, 7 are represented on the user interface.

The user interface 1 offers the capability of zooming into or out of the process graphic. This principle allows an overall view of the plant, and also subplants, including the links between them, to also be viewed.

Figure 2:
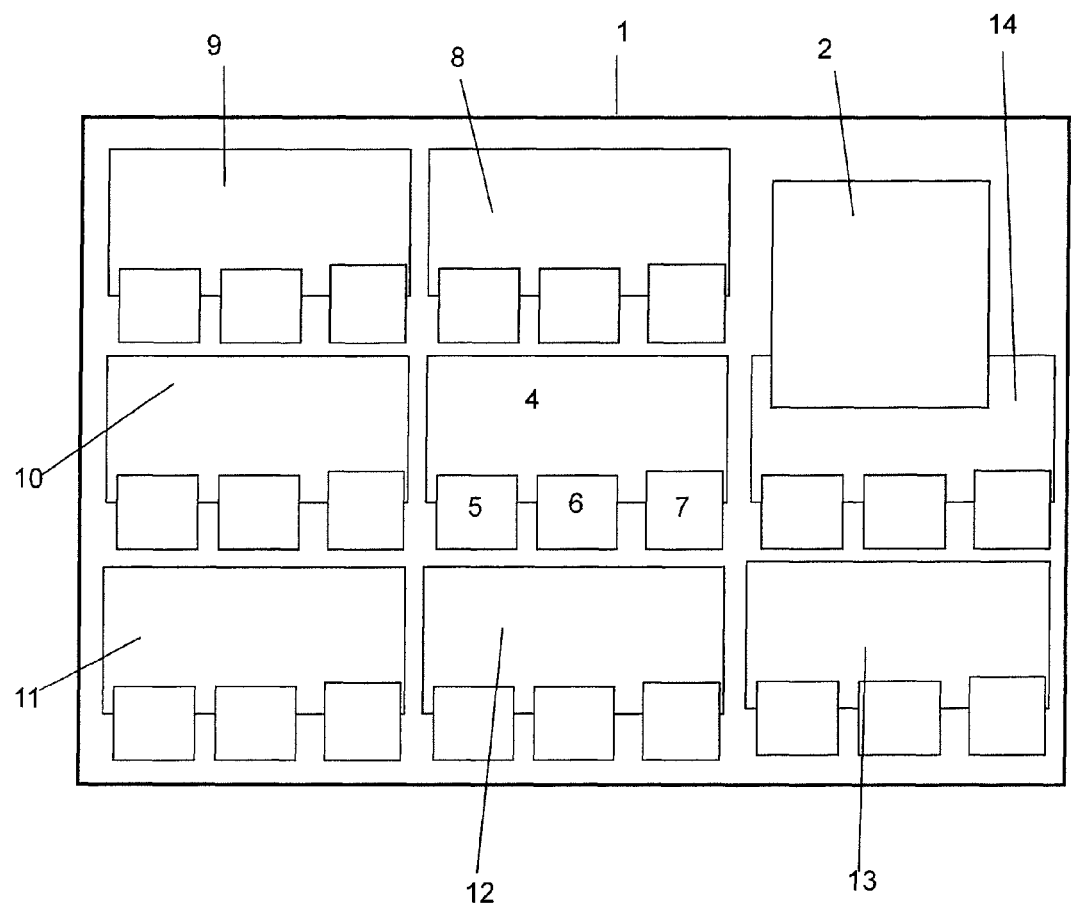

FIG. 2 schematically shows an overview of the user display screen of FIG. 1, wherein the size of the graphic representation was decreased by zooming. In FIG. 2, proceeding from the illustration in FIG. 1, a zoom has been performed out of the process graphic. A larger plant or process part is now graphically represented in FIG. 2; this view can also include the overview representation of the entire plant.

The object fields 4, 5, 6, 7, which can be relatively large in the illustration according to FIG. 1, and therefore well recognizable to a human user, well readable for the data represented therein, and well activatable for the operating elements contained therein, much smaller in the zoomed-out illustration according to FIG. 2. In addition, further object fields or object field subunits 8, 9, 10, 11, 12, 13, 14 can be added to the graphic representation.

However, the object fields can be so small in the zoomed-out representation that the data represented therein are no longer readable or are no longer well readable and the operating elements contained therein are no longer activatable or are no longer well activatable.

This does not apply for the object field 2, however. This is because the object field had previously been selected by the user in the illustration according to FIG. 1 for the purpose of display or user interaction, for example, in that it was marked with the mouse. It is then fixed on the user interface 1 in its size and at its object field position; one could also say it has been "pinned down", wherein the other object fields were decreased in their size during the zooming out. Therefore, the data or operating elements in the object field 2 are still well readable and well operable for the user even after the zooming.

The object field 2, while maintaining its size, could also have been displaced to another position, which is fixable by the user, on the user interface 1.

Furthermore, a predefinable condition for its automatic removal from the fixed position was added to the object field 2. This condition can be, for example, a specific valve setting, upon reaching which there is no longer a separate monitoring specification for the data displayed in the object field 2. The object field 2 can then be "shrunk" back to the smaller size corresponding to the selected zoom factor, as large as the other object fields in the illustration according to FIG. 2, or it can be removed entirely from the display.

Figure 3:
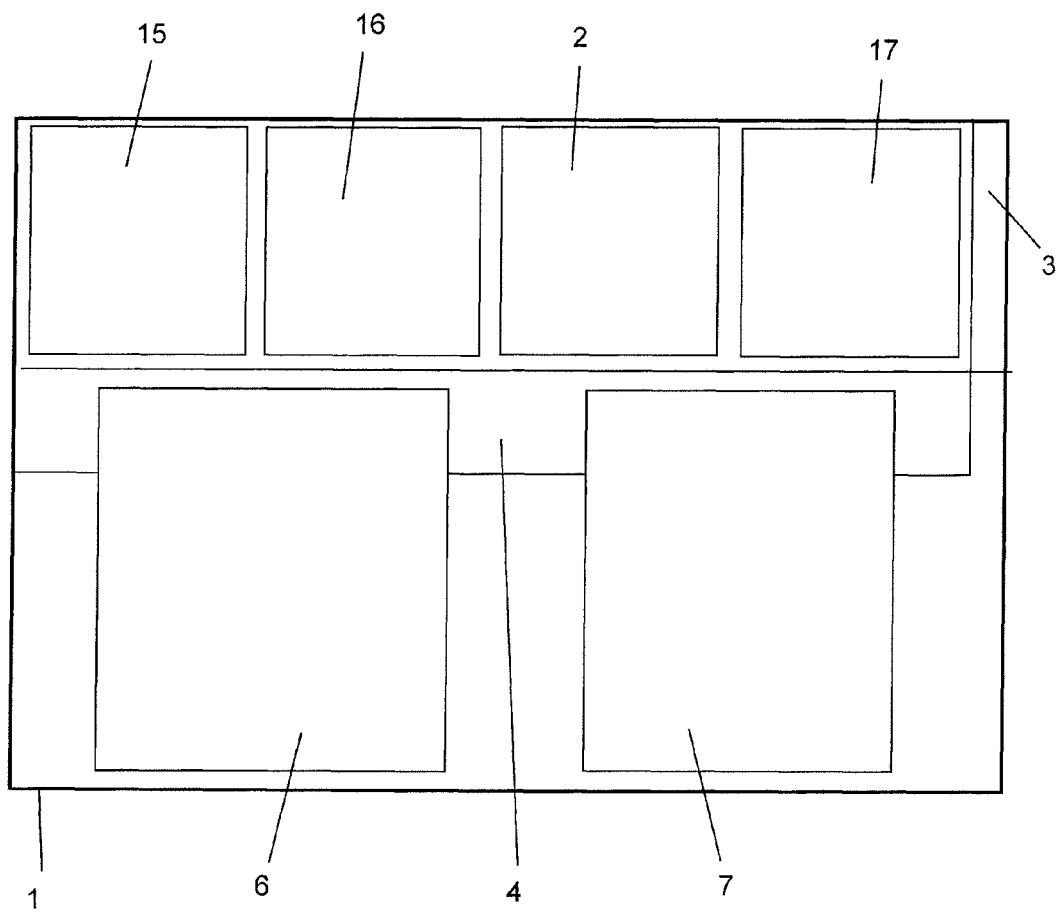

FIG. 3 schematically shows an overview of the user display screen of FIG. 1, wherein the size of the graphic representation was enlarged by zooming according to an exemplary embodiment of the disclosure. In FIG. 3, proceeding from the illustration in FIG. 1, zooming has been performed into the process graphic. As a result, a smaller plant or process part can be graphically represented in FIG. 3. Only a part of the object field 4 is still visible; the object fields 6 and 7 are greatly enlarged. Therefore, more details are visible in the object fields 6 and 7 than previously in the illustration according to FIG. 1.

At the representation size selected in FIG. 3, however, the object field 2 would have been pushed out of the region displayed on the user interface and therefore would no longer be visible in the graphic display on the user interface.

However, the object field 2 had previously been selected by the user in the illustration according to FIG. 1 for the purpose of display or user interaction, for example, in that it was marked using the mouse. According to the method according to the disclosure, it has now been displaced into an edge strip 3, which has opened on the upper edge of the user interface 1 upon the zooming into the graphic display. In this edge strip 3, the object field 2 is now fixed, one could also say "pinned down", in a size sufficient for the display or for the user interaction.

In the illustration of FIG. 3, the fixing of the object field 2 has been performed at a position on the user interface which deviates from the original object position of the object field 2.

If the zoom factor is changed again in the illustration according to FIG. 3, toward a factor such as FIGS. 1 and 2 are based on, the object field 2 automatically changes from the edge strip 3 back to its original position, as shown in FIG. 1. The edge strip 3 can also disappear again thereafter, if it has become empty.

Still further object fields 15, 16, 17 are located in the edge strip 3. These have been fixed in the edge strip 3 during preceding zooming procedures and are still located therein, until they either automatically change back to their original object position on the graphic display on the user interface through renewed zooming, or until they have been automatically removed after the entry of their "removal condition". They also can be selected for removal by the user.

The present disclosure also include arbitrary combinations of exemplary embodiments and individual design features or refinements, if they do not mutually preclude one another.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE NUMERALS 1 user interface
2 object field
3 edge strip
4 object field
5 object field
6 object field
7 object field
8 object field subunit
9 object field subunit
10 object field subunit
11 object field subunit
12 object field subunit
13 object field subunit
14 object field subunit
15 object field
16 object field
17 object field

What is claimed is:

1. A method for adapting a graphic representation on a user interface of a computer user station for graphically representing data of an industrial processing plant, comprising:
receiving, for display, input signals on or at the computer user station to change a size of a graphic representation of data by zooming a predefinable display region on the user interface and selecting an object field of the graphic representation, the object field being located in the graphic representation at an associated object field position;
displacing the selected object field into an edge strip on the user interface; and
displaying the selected object field in the edge strip if, due to zooming, the object field position is displaced into a region outside the user interface,
wherein the selection of an object field for display or user interaction, fixes a size of the object field on the user interface for display or user interaction, even if zooming of the graphic representation results in other data of the graphic representation not being readable or activatable by a user.

2. The method according to claim 1, comprising:
fixing the object field at or close to its object field position.

3. The method according to claim 1, comprising:
fixing the object field at a predefinable position, which deviates from an original object field position.

4. The method according to claim 1, comprising:
assigning a predefinable condition to the selected object field for automatic removal of the selected object field from the user interface.

5. The method according to claim 1, comprising:
providing an archive function, which detects the selection or a removal of an object field in an archiving manner.

6. The method according to claim 4, comprising:
detecting a reason for removal of the object field in an archiving manner upon removal of an object field.

7. The method according to claim 5, comprising:
archiving time curves of a pinned object or pinned information, respectively.

8. The method according to claim 5, comprising:
triggering the archive function by conditions which relate to at least one of a system state and an object type.

9. A system, comprising:
at least one computer user station for graphically representing data of an industrial processing plant, having a user interface, wherein the system includes a processor configured to execute a method for adapting a graphic representation of data on the user interface according to claim 1.

10. A non-transitory computer-readable storage medium on which a program is stored, the program when loaded into a storage means of the computer user station, allows the computer user station to execute a method for graphically representing data of an industrial processing plant on a user interface, comprising:
receiving input signals on or at the computer user station to change a size of a graphic representation of data by zooming a predefinable display region on the user interface and to select an object field of the graphic representation, which is located in the graphic representation at an associated object field position, for display; and
displacing the selected object field into an edge strip on the user interface; and
displaying the selected object field in the edge strip if, due to zooming, the object field position is displaced into a region outside the user interface,
wherein the selection of an object field for display or user interaction, fixes a size of the object field on the user interface for display or user interaction, even if zooming of the graphic representation results in other data of the graphic representation not being readable or activatable.

11. A method for adapting a graphic representation of an industrial processing plant on a user interface of a computer user station, the computer user station having at least one input device, the method comprising:
selecting, through the at least one input device, an object field of the graphic representation on the user interface;
adjusting, through the at least one input device, a size of the graphic representation by a first specified factor by zooming into or out of a display region;
fixing the object field on the user interface in a size for display when the first specified factor of the size adjustment of the graphic representation is outside of a threshold;
displacing the selected object field to an edge strip of the display region;
readjusting the size of the graphic representation to a second specified factor; and
removing the selected object from the edge strip when the second specified factor is within the threshold.

12. The method of claim 11, comprising:
displaying the edge strip at an upper edge of the user interface.

13. A method for adapting a graphic representation on a user interface of a computer user station for graphically representing data of an industrial processing plant, comprising:

receiving, for display, input signals on or at the computer user station to change a size of a graphic representation of data by zooming a predefinable display region on the user interface and selecting an object field of the graphic representation, the object field being located in the graphic representation at an associated object field position; and assigning a predefinable condition to the selected object field for automatic removal of the selected object field from the user interface, wherein the selection of an object field for display or user interaction, fixes a size of the object field on the user interface for display or user interaction, even if zooming of the graphic representation results in other data of the graphic representation not being readable or activatable by a user.

14. The method according to claim 13, comprising:
fixing the object field at or close to its object field position.

15. The method according to claim 13, comprising:
displacing the selected object field into an edge strip on the user interface.

16. The method according to claim 15, comprising:
displaying the selected object field in the edge strip if due to zooming the object field position is displaced into a region outside the user interface.

17. The method according to claim 13, comprising:
fixing the object field at a predefinable position, which deviates from an original object field position.

18. The method according to claim 17, comprising:
detecting a reason for removal of the object field in an archiving manner upon removal of an object field.

19. The method according to claim 13, comprising:
providing an archive function, which detects the selection or a removal of an object field in an archiving manner.

20. The method according to claim 19, comprising:
archiving time curves of a pinned object or pinned information, respectively.

21. The method according to claim 19, comprising:
triggering the archive function by conditions which relate to at least one of a system state and an object type.

\* \* \* \* \*